United States Patent [19]

Szalay et al.

[11] 4,012,220
[45] Mar. 15, 1977

[54] COMPOSITION FOR SUPPLYING THE SPECIFIC DEFICIENCY IN MICROELEMENTS OF PLANTS CULTIVATED ON PEATY SOILS

[75] Inventors: Sándor Szalay; Zoltán Sámsoni, both of Debrecen, Hungary

[73] Assignee: Magyar Tudomanyos Akademia Atommag Kutato Intezete, Debrecen, Hungary

[22] Filed: Aug. 8, 1975

[21] Appl. No.: 603,200

[30] Foreign Application Priority Data

Aug. 15, 1974 Hungary .................. MA 2597

[52] U.S. Cl. .................. 71/11; 71/27; 71/53; 71/64 C; 71/64 HC; 71/DIG. 2; 260/536
[51] Int. Cl.² .................. C05G 3/00; C05G 3/06
[58] Field of Search .............. 71/1, 53, 63, DIG. 2, 71/11, 27, 31, 64 SC

[56] References Cited

UNITED STATES PATENTS

| | | | |
|---|---|---|---|
| 2,943,100 | 6/1960 | Holstein | 71/DIG. 2 X |
| 3,074,927 | 1/1963 | Saltman et al. | 71/1 X |
| 3,130,038 | 4/1964 | Thomas | 71/1 X |
| 3,131,048 | 4/1964 | Balassa | 71/1 |
| 3,753,675 | 8/1973 | Young | 71/DIG. 2 X |

*Primary Examiner*—Frank A. Spear, Jr.
*Assistant Examiner*—Lander Ferris H.
*Attorney, Agent, or Firm*—Karl F. Ross; Herbert Dubno

[57] ABSTRACT

An aqueous micronutrient fertilizer foliage spray solution for plants cultivated on peat soils which comprises 0.1 to 5% $Mn^{2+}$ 0.03 to 1.2% $Cu^{2+}$ and 0 to 1.6% $Fe^{2+}$ ions with reference the total weight of the solution and having a weight ratio of $Cu^{2+}$ to $Mn^{2+}$ between 1:3 to 1:6, said solution being aqueous and containing tartaric acid in an amount of 0.05 to 2% by weight and 0.02 to 0.8% by weight of a chelating agent. The solution having a pH of 4 to 6.

3 Claims, No Drawings

COMPOSITION FOR SUPPLYING THE SPECIFIC DEFICIENCY IN MICROELEMENTS OF PLANTS CULTIVATED ON PEATY SOILS

This invention relates to a composition for rectifying the specific deficiency of microelements for plants cultivated in peaty soils.

It has been established by research work carried out for years that peat soils do not provide plants with a sufficient amount of the microelements primarily manganese (Mn), secondly copper (Cu) and in some places thirdly iron (Fe), which were required for their healthy development (S. Szalay, M. Sziláayi, Z. Sámsoni: Agrokémiaés Talajtan 19, 34–54 (1970), S. Szalay, Z. Sámsoni, M. Szilágyi: Agrokémia és Talajtan 19, 13–26 (1970), S. Szalay, M. Szilágyi, Z. Sámsoni: Agrokémia és Talajtan 19, 1–12 (1970), Szalay 6th Int. Meeting on Organic Geochem. Sept. 1973, Rueil Malmaison (Paris) Editions Technique Paris, 1974). Moreover it has been well known for a long time that the deficiency in microelements is injurious both to the quantity and quality of crops cultivated in such soils. It has also been known for some time that animals consuming fodder require certain microelements especially copper and iron and without these elements deficiency diseases appear (see e.g. György Tölgyesi: A növények mikroelem tartalma és ennek mezőgazdasági vonatkozásai, Mezőgazdásagi Könyvkiadó, Budapest, 1969).

It has been shown by further investigations that the quantity and quality of the crop cannot be improved by simply adding microelements into the peaty soils by means of fertilizers since these microelements are absorbed by the peak humic acids and so only a reduced amount of the microelements is available for absorbtion by the root system of the plants (S. Belak, D. Györi, Z. Sámsoni, S. Szalay, M. Szilágyi, A. Tóth: Agrokémia és Talajtan 18, 263–288 (1969)), S. Belák, D. Györi, Z. Sámsoni, S. Szalay, M. Szilágyi, A. Tóth: Agrokémia és Talajtan 19, 27–38 (1970)), S. Szalay, z. Sámsoni, M. Szilágyi: Agrokémia és Talajtan 19, 39–54 (1970)).

These microelements can, however, be applied to the leaves of the plants in the form of a suitable spray ("foliage spray"), in this way they can be absorbed entirely through the leaves.

Several sprays containing microelements are known. They are intended for general use on plants grown on soils containing an insufficient amount of microelements and usually they contain all of the microelements in a dilute solution. These compositions are, however, not suitable for rectifying the specific deficiency of microelements of plants cultivated on peat soils. On peat soils a considerable amount of manganese and a smaller amount of copper and iron are required whereas there is no need for supplying zinc, boron, cobalt and other microelements. A further, known problem is that in peat soils the plants absorb too large an amount of molybdenum although the animals require a certain balanced ratio (about 5:1) of copper and molybdenum in the fodder. If the fodder contains too little Cu and Mn and at the same time too much Mb, the symptons of the deficiency disease appear in an increased degree is the animals since the absorption of Cu is reduced by the Mb. The microelement sprays which contain molybdenum thus, are not suitable for peaty soils (Gy. Tölgyesi: A növények mikroelem tartalma és ennek mezögazdasági vonatkozásai, Mezögazd. könyvkiadó, Budapest, 1969).

A further requirement relating to the composition is that it should contain the microelements in a form required by the plants and easily absorbed through the foliage. The $Mn^{2+}$ and $Fe^{2+}$ ions can easily be absorbed, but spread in a thin layer in the form of an almost neutral solution they become oxidized in air to $Mn^{3+}$ $Mn^{4+}$ and $Fe^{3+}$ ions. These ions precipitate in the form of the corresponding insoluble oxide-hydroxide and so they cannot be absorbed by the leaves of the plants. This oxidation should be inhibited.

A further requirement is that the composition should not exert a caustic acidic effect; it should not burn the leaves of the plants.

The object of the invention is to provide a composition which contains the microelements missing from the plants cultivated on peaty soils ($Mn^{2+}$, $Cu^{2+}$ and $Fe^{2+}$) in the required ration and in such form so that when sprayed onto the leaves of the plants the deficiency is properly remedied.

The invention relates to a composition preferably to a spray concentrate, which contains 0.5 to 5 % of $Mn^{2+}$, 0.03 1.2 % of $Cu^{2+}$ and 0 to 1.6 % of $Fe^{2+}$ ions (relative to the total weight of the solution) in aqueous solution, preferably in the form of sulfates, a reducing agent, preferably tartaric acid and a complex forming agent, preferably ethylenediaminetetra-acetic acid in the form of its sodium salt, optionally a substance for increasing the hygroscopicity of the composition and ammonium hydroxide in order to adjust the pH value to 4 to 6. The ratio of copper to manganese is about 1:3–1:6, preferably 1:4.

The presence of the tartaric acid as the reducing agent in the composition is very advantageous as the formation of complexes of the $Cu^{2+}$ and $Fe^{2+}$ ions is ensured by it. Furthermore a mild reducing protective effect is provided for the $Mn^{2+}$ and $Fe^{2+}$ ions. This is particularly advantageous because the composition of the invention contains a considerable amount of $Cu^{2+}$ ions which can be stored without hydrolysis and precipitation only in a strongly acidified solution a strongly acidic solution cannot be sprayed on the leaves of the plants so care must be taken to ensure of the partial neutralization of the composition while at the same time the copper is kept in solution.

The composition of the invention preferably contains ethylenediamine tetraacetic acid in the form of its sodium salt as a complex forming agent, this ensures that the three microelements remain in the solution in ionic form and a considerable amount of tartaric acid can be saved.

The pH value of the composition is adjusted to 4–6, preferably to 5, advantageously by the addition of ammonium hydroxide.

In order to increase the hygroscopic properties of the composition, preferably ammonium nitrate is added.

The following example is illustrative of the invention:

EXAMPLE

Foliage Spray concentrate

The following components are dissolved in 25 liters of water:

3.60 kg $MnSO_4.H_2O$ (=4.8 % Mn)
1.20 kg $CuSO_4.5H_2O$ (=1.2 % Cu)
2.00 kg $FeSO_4.7H_2O$ (=1.6 % Fe)
0.50 kg tartaric acid (=2.0 %)

0.30 kg $NH_4NO_3$ (=1.2 %)
0.20 kg EDTA-Na (=0.8 %).

Then the pH of the solution is adjusted to 5 by the addition of an ammonium hydroxide solution.

The concentrate thus obtained is diluted with water before use. The degree of the dilution is determined by the spraying technique. The above amount is enough for a single spraying of 1 hectar of crops grown in peat soil.

When spraying the foliage from the ground the composition would be diluted with water to a 40-fold volume, whereas when spraying from an airplane a 6-fold dilution with water is enough.

In order to achieve a better wetting effect, preferably a known wetting agent is added to the spray solution (e.g. a fatty acid sulfonate etc.) in an amount of 0.02 %.

The use of the above composition has been found to be very successful. Silo corn was sprayed twice with the above composition on test plots having a surface area of 2500 m$^2$ in peat soils at Balatonfenyves, Hungary. The iron content of the dry matter of the corn samples of the untreated control plots was on the average 192.6 ppm, the manganese content 6.07 ppm and the copper content 8.4 ppm, whereas on the treated plots the iron content increased to 203 ppm, the manganese content to 48 ppm and the copper content to 12 ppm. The green crop on the sprayed plot was by 76 % higher when compared with the untreated crop.

What we claim is:

1. An aqueous micronutrient foliage spray for the foliage of plants cultivated on a peat soil which consists essentially of an aqueous solution containing 0.1 to 5% by weight of $Mn^{2+}$ 0.03 to 1.2% $Cu^{2+}$ and 0. to 1.6% $Fe^{2+}$ in addition to sufficient tartaric acid reducing agent to prevent oxidation of the manganese and iron on the foliage of the plants to insoluble oxide-hydroxide, and an effective amount of a chelating agent to complex the manganese, copper and iron to maintain the same in solution, the solution, having a pH of 4 to 6 and the ratio of copper to manganese being 1:3 to 1:6.

2. The foliage spray defined in claim 1 which consists essentially of 4.8% by weight manganese, 1.2% by weight copper, 1.6% by weight iron, 2.0% by weight tartaric acid, 1.2% by weight ammonium nitrate, 0.8% by weight of sodium ethylenediamine tetraacetic acid, and sufficient ammonium hydroxide to bring the pH of the solution to about 5.

3. The foliage spray defined in claim 2 which further includes 0.02% of a fatty acid sulphonate wetting agent.

* * * * *